UNITED STATES PATENT OFFICE.

CYRUS M. WARREN, OF BROOKLINE, MASSACHUSETTS.

COMPOSITION FOR ROOFING AND PAVING.

SPECIFICATION forming part of Letters Patent No. 248,072, dated October 11, 1881.

Application filed June 9, 1879.

*To all whom it may concern:*

Be it known that I, CYRUS M. WARREN, a citizen of the United States, residing in Brookline, in the county of Norfolk and State of Massachusetts, have invented a new and useful Composition of Matter to be used in the Construction of Concrete Pavements, Roofs, and for other Purposes, of which the following is a specification.

My composition consists of the following ingredients, combined in the proportions stated, viz: refined Trinidad asphaltum, three hundred pounds; coal-tar residuum of similar consistency, three hundred pounds; liquid wax-tailings, one hundred pounds; dead oil from coal-tar, a volume equal to the combined volume of the above-mentioned ingredients, or about sixty-five gallons.

Instead of the ordinary coal-tar residuum I prefer to employ in the above compound the residuum described in my Patent No. 228,960.

To prepare my compound, the asphaltum, coal-tar residuum, and wax-tailings are melted together and thoroughly mixed by agitation, and then united in a similar manner with an equal volume of dead-oil, forming a compound of about the consistency of thick coal-tar; or, instead of the coal-tar residuum in the above compound, an equal weight of Trinidad asphaltum may be substituted, in which case petroleum residuum may be substituted for the wax-tailings. And in this case; also, instead of dead oil as a thinning and drying material, any suitable drying oil or tar may be substituted.

I do not confine myself to the exact proportions herein stated, as these may be varied more or less within the scope of my invention, according to the locality and the use for which the compound is required.

The object of this invention is to provide a fluid asphaltic compound with limited drying properties, which, when exhausted, will leave as a residuum a permanently pliable or elastic cement of suitable consistency, strength, and toughness to serve as a durable binding material for concrete walks and roofs, to be used without artificial heat in the same manner that coal-tar and other fluid materials have been employed for these purposes.

I am aware that a composition consisting of natural bitumen or pitch, or coal-tar pitch, and pyrogenous oil of resin, which is a drying-oil, or other analogous oil, combined in proportions suitable to adapt the compound for use in the cold state, has been employed as a paving material; but I am not aware that natural bitumen combined with petroleum residuum or wax-tailings, or other non-drying oil, in proportions to form a firm paving or roofing cement, and this compound combined with a drying-oil in such proportion as to form a fluid material at the common temperature, has ever been employed for this purpose.

What I claim, and desire to secure by Letters Patent of the United States, is—

The herein-described composition of matter, to be used as a paving or roofing material, consisting of natural asphaltum, coal-tar residuum, liquid wax-tailings, and dead-oil, substantially in the proportions specified.

CYRUS M. WARREN.

Witnesses:
SAML. M. WARREN,
ALLEN LINCOLN.